Dec. 30, 1952     G. BOULET     2,623,355
HOT PRESSURIZED GAS PRODUCING MEANS
Filed April 22, 1948     3 Sheets-Sheet 1

Inventor
G. Boulet

Dec. 30, 1952 — G. BOULET — 2,623,355
HOT PRESSURIZED GAS PRODUCING MEANS
Filed April 22, 1948 — 3 Sheets-Sheet 2

Inventor
G. Boulet
By Mason Downing Heckld
Attys

Dec. 30, 1952          G. BOULET          2,623,355
HOT PRESSURIZED GAS PRODUCING MEANS
Filed April 22, 1948          3 Sheets—Sheet 3
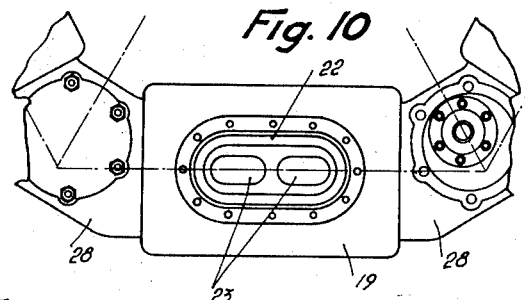
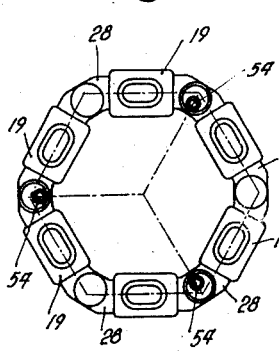
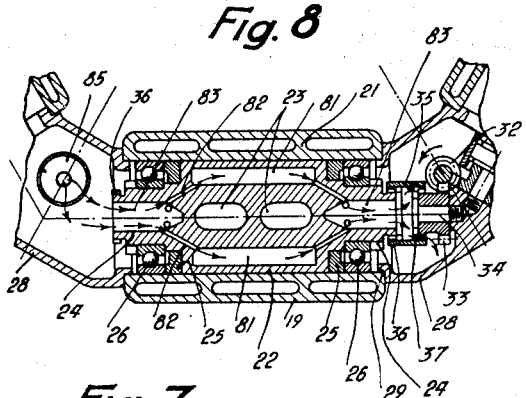
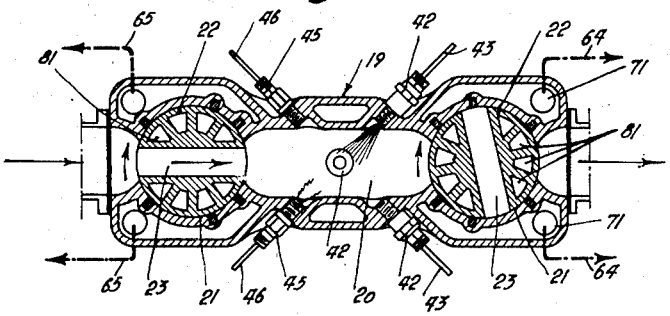
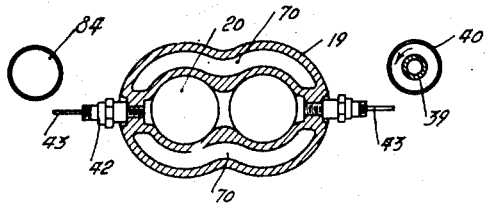
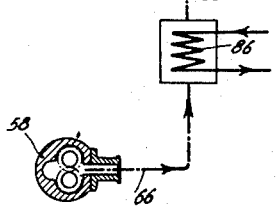
Inventor
G. Boulet Patented Dec. 30, 1952

2,623,355

UNITED STATES PATENT OFFICE 2,623,355

HOT PRESSURIZED GAS PRODUCING MEANS

Georges Boulet, Toulouse, France

Application April 22, 1948, Serial No. 22,566
In France April 30, 1946

10 Claims. (Cl. 60—39.38)

My invention relates to the production of driving power and more particularly to the production of driving power in a thermodynamic way.

This application is a continuation-in-part of my application Serial No. 330,429, filed April 18, 1940, now abandoned.

One object of my invention is to provide means for producing within a heating chamber of unvarying volume a body of hot gases under pressure and for periodically opening an outlet of said chamber, whereby periodically allowing said body of gases to escape out of the heating chamber.

Another object of my invention is to provide a reaction jet in which a body of air is heated within a heating chamber of unvarying volume which is not in permanent connection with the atmosphere but is discontinuously and periodically connected thereto.

A further object of my invention is to devise means for periodically opening and closing a chamber of unvarying volume and adapted for the production therein of hot gases under pressure.

A still further object of my invention is to provide a thermic machine for producing driving power and comprising a plurality of hot gases producing chambers united together, the volume of each of which is substantially constant, and means whereby said chambers are discontinuously connected with the atmosphere in a periodic manner and in a proper sequence.

With these and other objects in view my invention resides in the novel means and combination of parts as will be hereinafter described and more fully pointed out in the claims.

In the annexed drawings:

Fig. 7 is a section along line VII—VII of Fig. 6;

Fig. 8 is a section along line VIII—VIII of Fig. 6;

Fig. 9 is a section along line IX—IX of Fig. 6;

Fig. 10 is a side view of the heating chamber shown in Fig. 6;

Fig. 11 is a general view showing a plurality of heating chambers united together in a crown; and Fig. 12 is a section along line XII—XII of Fig. 6.

Figure 1:
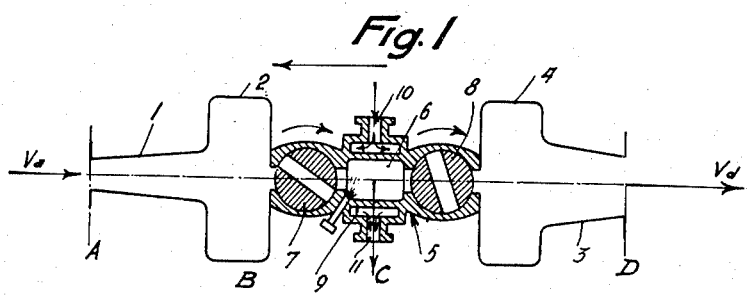
Fig. 1 is a diagram representing a reaction jet including a heating chamber according to my invention.

In Fig. 1, where my invention is diagrammatically shown as embodied in a reaction jet, the latter includes a divergent inlet passageway 1 leading to an intake manifold 2, and a convergent escape passageway 3 in communication with an escape manifold 4. The manifolds 2 and 4 are connected together by a plurality of heat exchange ducts 5 only one of which is shown. Each duct 5 comprises a central jacketed portion 6 and the passage therethrough is controlled by two cocks 7 and 8 located fore and aft said central portion 6. The plugs of said cocks are rotatable within the plug shells and are positively connected together to be rotated in positive time relation by means not shown. The jacket 9 of the central portion of the duct 5 is provided with an inlet 10 and an outlet 11 for the circulation through said jacket 9 of a fluid by means not shown.

Figure 2:
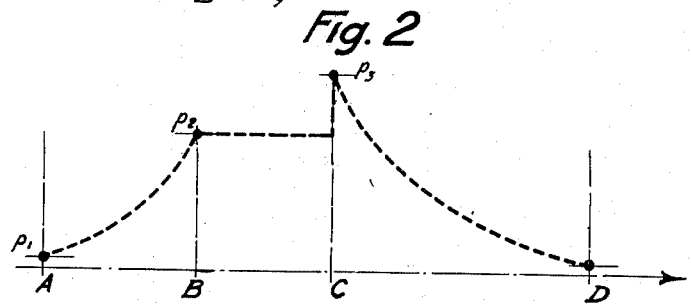
Figs. 2 and 3 are diagrams showing the thermodynamic evolution of the heated fluid during its flow through the reaction jet illustrated in Fig. 1.
Figure 5:
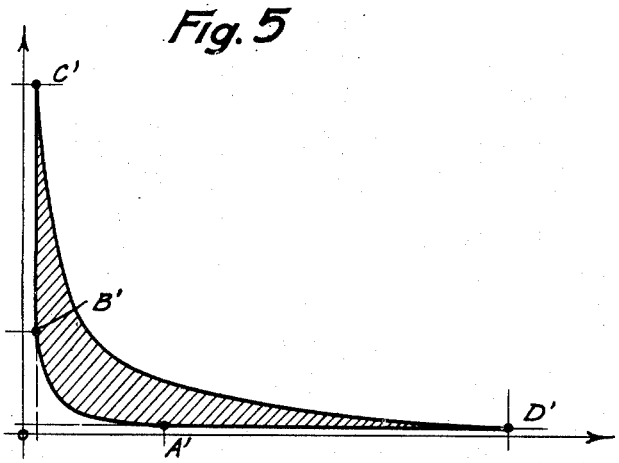
Fig. 5 is a diagram showing the thermodynamic evolution of the heated fluid during its flow through the turbo-jet illustrated in Fig. 4.

The operation is as follows:

Air enters the divergent passageway 1 at A with a speed $V_a$ and flows therethrough with a progressively slowed down speed while its pressure increases from $p_1$ to $p_2$ as shown by the curve AB in Fig. 2 in which the ordinates represent the pressures of the air body and the abscissae the travel of this air body through the reaction jet. The air flows then into the intake manifold 2 wherefrom the distributing cock 7 allows it periodically to flow into the central portion of the duct 5 whilst the cock 8 still cuts off the communication between said central portion and the escape manifold; during this travel BC the pressure $p_2$ of the air remains substantially unchanged. The setting of the cocks is such that immediately after the cock 7 again cuts off the communication of the central duct portion with the intake manifold 1 whereas the cock 8 still remains closed. The air then confined within the chamber 5 is then heated either by heat generated within said chamber 5, or else by circulation of a hot fluid in the jacket 9, for instance of a fluid having served to cool hot parts of a machine, the reaction jet then taking up at the same time the function of radiator. The air in the chamber 5 is thus heated at constant volume and the pressure at C increases from $p_2$ to $p_3$. Then the cock 8 while continuing to rotate connects chamber 5 with the escape manifold 4 so that the body of hot air under pressure within said chamber 5 escapes into said exhaust manifold 4 and from there into the convergent duct 3 where it expands as shown in Fig. 2 from C to D; it exhausts at D with a speed V$d$ higher than its admittance speed V$a$.

Figure 3:
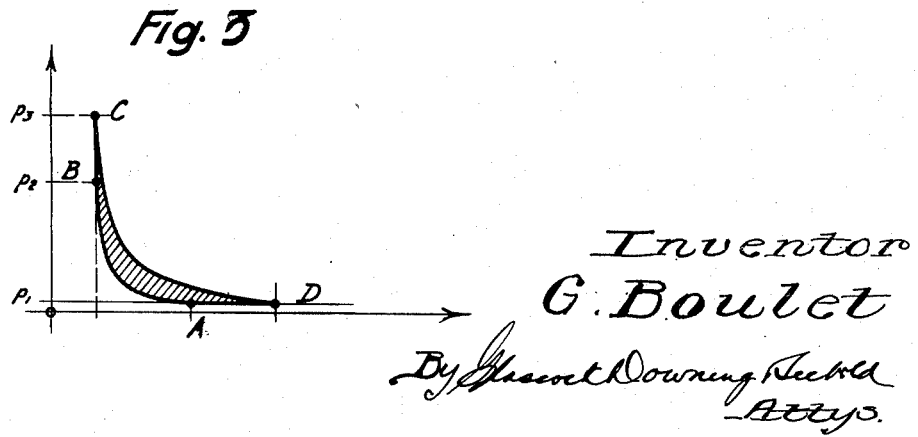
Figure 6:
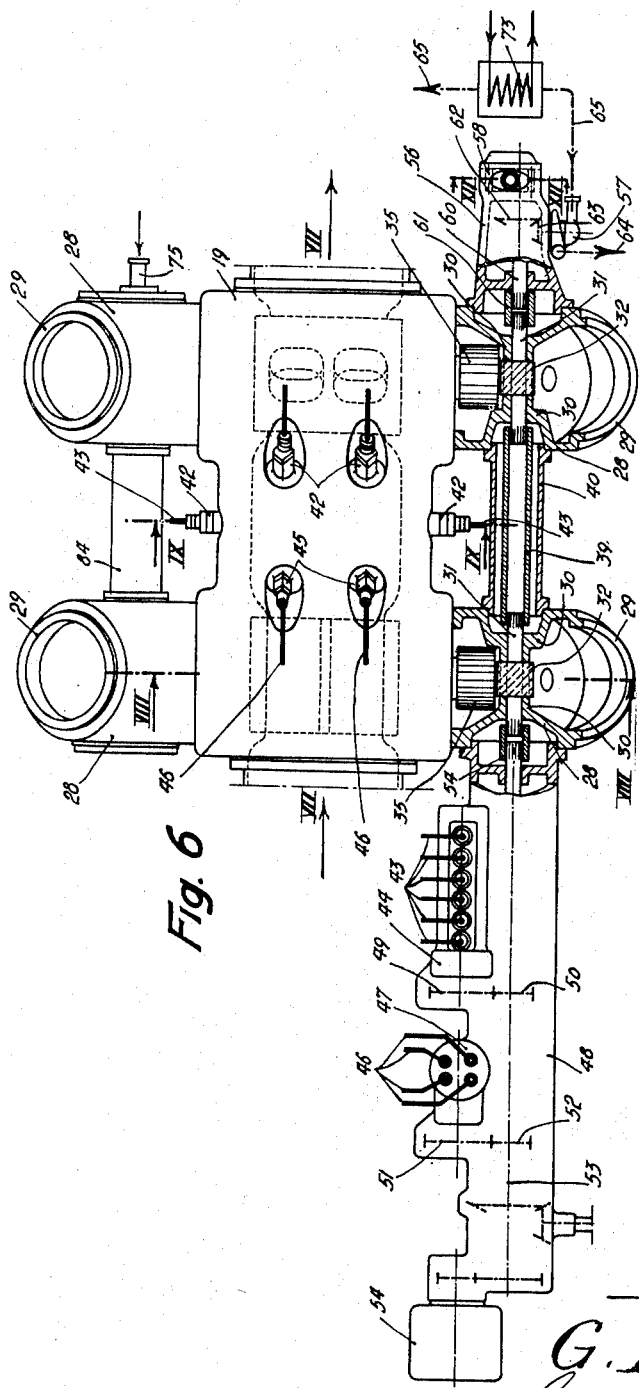
Fig. 6 is an external view with parts in section of an embodiment of heating chamber according to my invention.

Fig. 3 is a diagram corresponding to the above operation the ordinates representing pressures and the abscissae, specific volumes. The setting of the cocks 7, 8 and the dimensions of the orifices of the cock-shell are preferably such that the cock 7 opens a little before the cock 8 closes in a manner that there is, during a short time, direct connection between the manifolds 2 and 4 and as a result, a short period of cold air circulation.

The cocks controlling the different cells or ducts 5 for producing hot gases under pressure are connected together so that the different cells are not simultaneously put to the exhaust, but successively.

Figure 4:
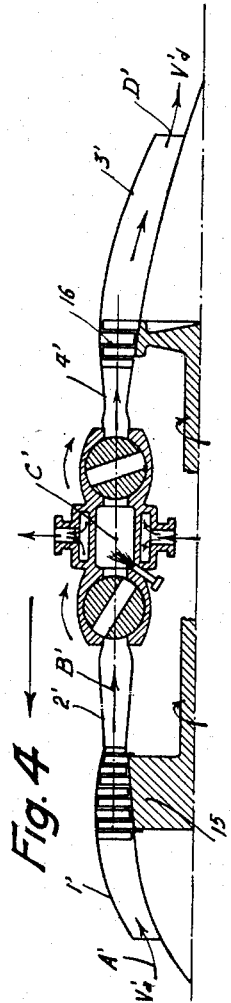
Fig. 4 is a diagrammatic section through the axis of a turbo-jet according to my invention.

Instead of serving to heat the gases in the chamber 5, the fluid circulating in the jacket 9 may serve to cool the walls of said chamber when the heating is done by heat developed within said chamber. The machine shown in Fig. 4 differs from the previous in that the admission and escape manifold 2' and 4' are annular and that the air is driven into said admission manifold 2' by an axial compressor 15 with several stages and an annular blading, fed by an annular divergent pipe 1'. In another connection, the exhaust manifold 4' feeds a turbine 16 whose exhaust takes place through a convergent pipe 3'. Elsewhere the means to make exhaust manifolds 2' and 4' connect, are identical to those described above.

The diagram 5 is similar to that of Fig. 3 and shows the evolution of the pressures and volumes of the body of air from the admission A' of the machine and its exit D'.

In the preferred embodiment of chamber for producing hot gases under pressure shown in Figs. 6 to 12 the inside of a hollow flat shaped block 19 in one piece forms a large flat sectional duct which extends through the block from one end to another and opens on two opposite faces of said block. The central part of this duct forms the chamber 20 for the production of hot gases under pressure. On each side of this chamber 20 the inside of the block 19 is shaped to provide along two small sides of said chamber 20 two cylindrical housings or shells 21 in communication with said chamber 20 and the inner diameter of each of which is larger than the thickness of said chamber. Each of these housings has its axis situated in the plane passing at the medium thickness of chamber 20 and extends throughout the block 19 perpendicularly to the general axis of the duct. In each of said housings 21 is fluid tightly and rotatably fitted a plug 22 having its central part intersecting said duct and pierced with holes or ways 23. On each side of said central part each plug is provided with a trunnion 24 of smaller diameter surrounded by a sealing ring 25 in engagement with the adjacent end of the central part, and said trunnion is journaled in a roller-bearing 26 fitted in the housing 21. On each end of the shells 21 is secured a small casing 28 provided with a cylindrical bearing surface 29 pointing in the adjacent cylindrical shell end. In bearings 30 formed by each of the two casings 28 fixed on one of the faces of the block 19 is journaled a small shaft 31 on which is secured a worm gear 32 in mesh with a helical gear wheel 33 rotatably carried by a stud 34 fixed to the casing 28. Each wheel 33 is connected rotatingly to the adjacent plug 22 by an internally splined sleeve 35 in engagement with the correspondingly splined ends 36 of the trunnion 24 and 37 of the hub of the wheel 33. The shafts 31 carried by the two small casings 28 secured on the same face of the block 19 are positively connected to each other by a hollow shaft 39 internally splined at its two ends and engaged on the correspondingly splined opposite ends of the shafts 31. A tube 40 fixed at its two ends on said two casings 28 surrounds at a distance said shaft 39. The two plugs respectively situated above and below the chamber 20 when hot gases are to be produced are thus rotatingly connected in a positive manner.

In this embodiment the block 19 is provided with six injectors 42 of any suitable type, placed above, below and on the sides of the chamber, other than those bordered by the plugs 22. Said injectors 42 are connected by tubes 43 to an injection pump 44 of any suitable type. The block 19 is also provided with four spark-plugs 45 connected by wires 46 to an ignition device 47 of any suitable type. Pump 44 and ignition device 47 are carried by a casing 48 and driven through the medium of gear wheels 49, 50 and 51, 52 by a shaft 53 journaled inside the casing 48 and driven by an electric motor 54 secured on said casing 48. The casing 48 is secured on one of the casings 28 in which are journaled the shafts 31 driving the plugs 22 and the shaft 53 placed in alignment with the shaft 31 of said casing 28 is coupled to said shaft 31 by a splined sleeve 55. On the other casing 28, likewise at end of the shaft 31 of said casing 28 is fixed a small casing 56 carrying a pump 57 for circulating a cooling fluid and a lubricating pump 58. Inside said casing 56 is journaled a shaft 60 coupled at one end to the shaft 31 by a splined sleeve 61 engaging the splined ends of both said shafts 60 and 31; the other end of the shaft 60 drives the pump 58 directly and, through the medium of gears 62, 63, the pump 57. Pumps 57 and 58 feed respectively, through the pipes 64, 65 and 66, cooling and lubricating circuits which will now be described. The wall of the block 19 is hollow and forms, all around the central duct, a jacket 70 enclosing near its ends and on each side of the central duct tubes 71 with walls pierced with distribution holes. One end of the tubes 71 situated at one extremity of the central duct is connected to the piping 64 whilst at an end of the tubes situated at the opposite extremity of said central duct is connected piping 65 which passes by a thermic exchanger 73 before arriving at the pump 57. The cooling and lubricating circuit fed by the pump 58 includes the inside of the small casings 28 on one of which is fixed a union 75 for connection with the pipe 66. The two casings 28 situated on remote sides of the block 19 at the end of a same plug 22 communicate together through said plug 22 which includes for this purpose two inner chambers 81 provided on one and the other side of a middle wall inside which extend the ways 23. These inner chambers 81 communicate through holes 82 with recesses 83 axially provided in the ends of the trunnions 24 and which lead freely into the casings 28. Further the casings 28 situated on the same side of the block 19 communicate with each other through the tube 84 interposed between them and similar to tube 40. A diaphragm 85 is housed in said tube 84 to distribute between said two casings 28 the liquid pumped to the union 75 by the pump 58. Said pump draws up directly in the casing 28 on which it is mounted and its delivery pipe 65 passes by a thermic exchanger or radiator 86 before arriving at the union 75.

The means (spark-plugs 45 and injectors 42) described above to provide for the production of heat in the chamber 20 are only one of the examples of the means which it is possible to utilize. When the precompression is sufficient the ignition in the chamber can be carried out like in diesel engines, i. e. without spark-plugs; on the contrary the injectors can be dispensed with and the chamber 20 fed with air previously carbureted, for instance by a carburettor. Heat can also be produced by chemical reaction inside chamber 20 by introduction of suitable substances into said chamber as in rockets or even by atomic means.

The material for the block 19 can be a metal adapted to withstand high temperatures, ceramic or the like. The casings 28 can be used to unite together a plurality of blocks 19 if they are made to include a second bearing surface 29 on which is jointed the end of one of the housings 21 of a second block 19, as shown in Figs. 10 and 11. In this case, each shaft 31 drives the plugs 22 of the two blocks 19 secured to the same casing 28 (Fig. 8). The axes of said cylindrical bearing surfaces may be concurrent so that several blocks 19 assembled together in this manner will form a closed crown as shown in Fig. 11 where blocks 19 are six in number and constitute three pairs of which each includes its electric motor 54 driving the plugs of the two blocks of the pair. The plugs belonging to two adjacent pairs of blocks 19 have their trunnions situated in one of the casings 28 uniting these two pairs together which are connected positively to each other, for example by a Cardan shaft or by bevel gears.

What I claim is:

1. In pressure gas producing means including a rigid casing enclosing a heating chamber of substantially constant volume, valve means adapted to afford communication between said chamber and the outside and including a pair of apertured curved walls one of which embraces the other in close engagement therewith and the embraced wall forming part of a rotatable member arranged for continuous rotary motion inside the other wherein said member is provided with two external opposite trunnions journaled in said casing, at least one cover secured to said casing over one of said outer trunnion ends, and defining with the casing a chamber, a gear wheel located within said chamber and connected with said trunnion to be adapted to rotate the latter, and means for rotating said gear wheel, said means including a driving shaft projecting into said chamber through the wall defining the latter, and connected with said gear wheel to rotate the latter.

2. In pressure gas producing means as in claim 1, a shaft provided in said chamber defined by said cover, said shaft being carried by the cover wall and carrying said gear wheel.

3. In pressure gas producing means as in claim 1, a shaft provided in said chamber defined by said cover, said shaft carried by the cover in coaxial relation with the adjacent trunnion, said gear wheel carried by said shaft, and coupling means rotatingly connecting said gear wheel to said adjacent trunnion end.

4. In pressure gas producing means as in claim 1, further an electric motor externally carried by said cover and having its shaft projecting into said chamber through the wall thereof and thus constituting said driving shaft.

5. In pressure gas producing means including a plurality of hot pressure gas producing units assembled together, each of which comprises a casing enclosing a heating chamber of substantially constant volume and valve means adapted to afford communication between said chamber and the outside and including a pair of apertured curved walls, one of which embraces the other in close engagement therewith and the embraced wall forms part of a rotatable member arranged for continuous rotary motion inside the other, said rotatable member being provided with two external opposite trunnions journaled in said casing, covers each of which is secured both to a casing and the adjacent one over the outer trunnion ends, each of said covers defining with the adjacent casings a closed chamber, and means in said chamber rotatingly connecting together the adjacent trunnions.

6. In pressure gas producing means as in claim 5, further, at least one driving shaft, the latter projecting into one of said closed chambers through the wall of the latter, to rotate the trunnions.

7. In pressure gas producing means including a plurality of hot pressure gas producing units assembled together, each of which comprises a casing enclosing a heating chamber of substantially constant volume and valve means adapted to afford communication between said chamber and the outside and including a pair of apertured curved walls, one of which embraces the other in close engagement therewith and the embraced wall forms part of a rotatable member arranged for continuous rotary motion inside the other, said rotatable member being provided with two external opposite trunnions journaled in said casing, at least one uniting casing having joint surfaces respectively in joint engagement with end faces of two adjacent units and means within said uniting casing and carried thereby, means to rotate said rotatable member of the valve means of each of the units in engagement with said uniting casing.

8. In pressure gas producing means including a rigid casing enclosing a heating chamber of substantially constant volume provided with an inlet and with an outlet, and valve means connected together and adapted to control respectively said inlet and outlet, each of said valve means including a pair of apertured curved walls one of which embraces the other in close engagement therewith and the embraced wall forming part of a rotatable member arranged for continuous rotary motion inside the other, said member being provided with two external opposite trunnions journaled in said casing, covers secured to said casing over one of said outer trunnion ends of each said rotatable member, said covers defining with the casing two chambers, a gear wheel located within each of said chambers and connected with said trunnions to be adapted to rotate the latter within each of said chambers, a short driving shaft projecting into said chambers through the wall defining the latter and drivingly connected to the gear wheel within said chamber, and means floatingly connecting said short shafts together.

9. In pressure gas producing means as in claim 8, said short shafts being alined and having splined opposite ends and a hollow shaft having internally splined ends in engagement with said correspondingly splined ends of the short driving shafts.

10. In pressure gas producing means as in claim 8, said short shafts being alined and having splined opposite ends, a hollow shaft having internally splined ends in engagement with said correspondingly splined ends of the short driving shafts, and a housing secured at its two ends on said two covers and enclosing at a distance said hollow shaft.

GEORGES BOULET.

REFERENCES CITED

The following references are of record in the file of this patent:

UNITED STATES PATENTS

| Number | Name | Date |
|---|---|---|
| 106,206 | Rice et al. | Aug. 9, 1870 |
| 1,036,484 | Glass et al. | Aug. 20, 1912 |
| 1,083,943 | Raclot et al. | Jan. 13, 1914 |
| 1,769,994 | Hendryz | July 8, 1930 |
| 1,803,156 | Wagner | Apr. 28, 1931 |
| 1,974,834 | Sadwith | Sept. 25, 1934 |
| 2,004,945 | Holzwarth | June 18, 1935 |
| 2,168,166 | Larrecq | Aug. 1, 1939 |
| 2,427,845 | Forsyth | Sept. 23, 1947 |

FOREIGN PATENTS

| Number | Country | Date |
|---|---|---|
| 596,856 | Germany | May 11, 1934 |
| 439,805 | Great Britain | Dec. 6, 1935 |
| 447,283 | Great Britain | May 15, 1936 |
| 449,148 | Great Britain | July 23, 1936 |
| 454,266 | Great Britain | Sept. 28, 1936 |
| 638,735 | France | Feb. 27, 1928 |
| 42,477 | France | May 8, 1933 |
|  | (Addition to No. 747,754) | |